United States Patent [19]

Falk et al.

[11] 4,391,948
[45] Jul. 5, 1983

[54] EMULSION/SUSPENSION ASA GRAFT COPOLYMERS AS FLOW MODIFIERS FOR PVC

[75] Inventors: John C. Falk, Northbrook, Ill.; Mike S. D. Juang, Vancouver, Wash.

[73] Assignee: Borg-Warner Chemicals, Inc., Parkersburg, W. Va.

[21] Appl. No.: 392,423

[22] Filed: Jun. 25, 1982

[51] Int. Cl.$^3$ .................. C08L 27/06; C08L 51/04
[52] U.S. Cl. ........................... 525/57; 525/59; 525/74; 525/85; 525/243; 525/81; 525/82
[58] Field of Search ............. 525/85, 57, 59, 243

[56] References Cited

U.S. PATENT DOCUMENTS

| | | | |
|---|---|---|---|
| 2,890,199 | 6/1959 | McNulty et al. | 260/45.5 |
| 3,041,307 | 6/1962 | Baer | 525/85 |
| 3,436,440 | 4/1969 | Abe et al. | 260/880 |
| 4,011,283 | 3/1977 | Sturt | 260/880 R |

*Primary Examiner*—Carman J. Seccuro
*Attorney, Agent, or Firm*—Richard J. Schlott

[57] ABSTRACT

ASA graft copolymers prepared by an emulsion/suspension process are good flow and impact modifiers for PVC. Blends with PVC exhibit excellent physical properties and considerably better melt flow than PVC blends with conventional impact modifiers.

2 Claims, No Drawings

EMULSION/SUSPENSION ASA GRAFT COPOLYMERS AS FLOW MODIFIERS FOR PVC

BACKGROUND OF THE INVENTION

This invention relates to polymeric flow and impact modifiers for polyvinyl chloride (PVC) resin, and to novel PVC compositions. More particularly, the invention relates to particular graft copolymers (ASA) prepared by an emulsion/suspension process wherein acrylonitrile and styrene are polymerized in the presence of poly(butyl acrylate) as polymeric flow and impact modifiers for PVC, and to novel blends of particular ASA graft copolymers with PVC.

Blends of emulsion prepared graft ASA copolymers with PVC are disclosed in U.S. Pat. No. 3,041,307. Such PVC blends have good weatherability and good impact strength, but have undesirable melt flow. The emulsion/suspension prepared ASA copolymers of this invention impart substantially improved flow properties to blends with PVC while maintaining the good impact properties of ASA/PVC blends.

Polyvinyl chloride resins are commonly fabricated from powders or pellets by thermal processes including extrusion and injection molding, during which the particles must be fused into a molten mass. In conventional processing, the fusion and subsequent processing is aided by incorporation of plasticizers. These plasticizers also improve the flow and shear characteristics of the PVC resins by reducing the melt viscosity, thus enhancing the overall processability. Plasticizers, however, are not entirely satisfactory for many purposes inasmuch as they materially reduce the rigidity and heat distortion temperature of the resin when employed in amounts sufficient to improve melt flow.

A further method for improving processability has been to employ a blend of PVC with a second polymeric resin together with a monomeric plasticizer to compatibilize the blend. The second polymeric resin, for example, may be a block copolymer having both rigid and rubbery segments, such as those disclosed in U.S. Pat. No. 3,801,529. The use of large amounts of plasticizer in these compositions again reduces rigidity and the heat distortion temperature of the resin. It is desirable, therefore, to provide a processing aid which can be blended with a PVC resin to improve processability of the resin without a major decrease in the heat distortion temperature of the product composition.

SUMMARY OF THE INVENTION

It has been found that by blending a graft ASA copolymer prepared by the emulsion/suspension technique with PVC that the flow characteristic of the PVC is dramatically improved. The amount of the present graft ASA copolymer added to the PVC is in the neighborhood of 10 to 15 parts ASA per hundred parts of PVC.

There is no sacrifice of other properties. The heat distortion temperature, weatherability and impact strength of the PVC modified with the present emulsion/suspension prepared graft ASA copolymer are quite good.

DESCRIPTION OF THE PREFERRED EMBODIMENTS

The Graft ASA Copolymer

Graft ASA copolymers for use in the blends of the present invention were prepared by grafting styrene and acrylonitrile onto a crosslinked poly(butyl acrylate) latex. The grafting reactions began as emulsions and then converted into a suspension form when about half of the styrene and acrylonitrile monomers were added to the reaction mixture.

The poly(butyl acrylate) latex was prepared by batch polymerization utilizing emulsion techniques and using trimethylol propane triacrylate as a crosslinker and t-dodecyl mercaptan as a chain transfer agent. Poly(vinyl pyrrolidone) (PVP) and polyvinyl alcohol (PVA) suspending agents were added together with styrene and acrylonitrile monomers, a chain transfer agent (t-dodecyl mercaptan), and the polymerization catalyst. After polymerization was complete, the suspension polymer was filtered and dried in a fluidized bed drier at 50° C. for 40 minutes. The graft ASA copolymer was isolated as a free-flowing powder.

EXAMPLE 1

A. Preparation of the Poly(Butyl Acrylate) for the Graft ASA Copolymer

In the preparation of the graft ASA copolymer for use in the present blends, the poly(butyl acrylate) was first prepared using the following recipe:

| Ingredients | Parts |
| --- | --- |
| Demineralized Water | 230 |
| Sulframine 1240 | 0.6–1.0 |
| n-Butyl Acrylate | 65 |
| t-Dodecyl Mercaptan (TDDM) | 0.2 |
| Trimethylol Propane Triacrylate | 0.25–0.5 |
| Sodium Sulfate | 0.3 |
| Potassium Persulfate (PPS) | 0.3 |
| Temperature | 70° C. |

All ingredients were mixed and charged to a reactor except the potassium persulfate. While heating to the reaction temperature, the mixture was stirred and purged by nitrogen to remove oxygen from the reaction system. Potassium persulfate was added to the reactor when the temperature reached 70° C. An exotherm was observed in about 10–15 minutes, and the temperature increased to 88°–92° C. After the exotherm subsided the reaction was stirred for another hour at 70° C. The poly(butyl acrylate) latex was now ready for the graft reaction.

B. Preparation of the Graft ASA Copolymer (S:AN=3:2)

The graft ASA was prepared as follows:

| Ingredients | Parts |
| --- | --- |
| Poly (Butyl Acrylate) (30% solids latex from A) | 65 |
| Na$_2$SO$_4$ | 0.5 |
| Poly (Vinyl Pyrrolidone) | 0.2 |
| Polyvinyl Alcohol | 0.2 |
| Styrene | 21 |
| Acrylonitrile | 14 |
| Potassium Persulfate | 0.12–0.2 |
| t-Dodecyl Mercaptan (TDDM) | 0.1 |

The poly(butyl acrylate) latex, styrene, acrylonitrile and TDDM were charged to the reactor. While heating to the reaction temperature, with stirring, the mixture was purged with nitrogen. Appropriate amounts of sodium sulfate (as a 10% aqueous solution), poly(vinyl pyrrolidone) (as a 5% aqueous solution), and polyvinyl alcohol (as a 5% solution) were added to the reaction mixture when the temperature reached 70° C. The reaction mixture was stirred for 2 minutes, then the appropriate amount of potassium persulfate (as a 3% solution) was added to initiate polymerization. The reaction mixture converted from an emulsion to a suspension at about 60% conversion of styrene and acrylonitrile to polymer. At this point the reaction mixture's viscosity increased, thus additional water (30–100 ml) was added to facilitate stirring. The reaction was held at 70° C. for 2 hours. The reaction product was isolated by filtration thru a fine nylon cheese cloth. Drying was accomplished in a fluidized bed dryer. The product was in the form of free-flowing powder.

The following examples illustrate the preparation of blends typical of this invention. All blends shown were prepared by a standard procedure in which the following masterbatch formulation, in combination with the indicated amount of graft polyblend, was mill-mixed at 360° F. for 10 minutes, then a portion was compression molded at 360° F. for 4 to 10 minutes at 40,000 to 60,000 psi to provide test specimens.

EXAMPLE 3

PVC MASTERBATCH FORMULATION

| Material | Tradename and Source | Parts by Weight |
|---|---|---|
| PVC | SCC-614, Stauffer Chemical Co. | 100 |
| Processing Aid | Acrylic K120N, Rohm and Hass | 2.5 |
| Tin Stabilizer | Mark 534B, Argus Chemical Corp. | 2.5 |
| Lubricant | Hoechst Wax E, Farbwerke Hoechst, AG | 0.25 |
| Lubricant | Hoechst Wax OP, Fabwerke Hoechst, AG | 0.30 |
| Lubricant | Hoechst PA-190, Fabwerke Hoechst, AG | 0.15 |

A series of ASA graft copolymer flow improvers were prepared substantially by the process of Examples 1 and 2, employing variations in the level of trimethylol propane triacrylate and in the styrene-acrylonitrile ratio. Blends of these modifiers with the PVC masterbatch of Example 3 were then prepared and tested. The physical properties of these blends, together with those of a control blend containing a commercial acrylic-based PVC impact modifier, are summarized in Table I.

TABLE I

| PHYSICAL PROPERTIES OF ASA/PVC BLENDS (15 WT% ASA) | | | | |
|---|---|---|---|---|
| Ex. No. | 4 | 5 | 6 | Control A[2] |
| Modifier (1): | | | | |
| Trimethylol propane triacrylate, parts | 0.25 | 0.25 | 0.5 | — |
| S:AN | 3:2 | 3:1 | 3:1 | — |
| Properties: | | | | |
| Izod Impact (⅛in), ftlb/in | 14.2 | 18.2 | 15.8 | 19.0 |
| Flexural Modulus, psi | $3.41 \times 10^5$ | $3.26 \times 10^5$ | $3.17 \times 10^5$ | $3.11 \times 10^5$ |
| Flexural Strength, psi | $1.09 \times 10^4$ | $1.05 \times 10^4$ | $1.03 \times 10^4$ | $1.05 \times 10^4$ |
| Yield Strength, psi | $5.98 \times 10^3$ | $5.83 \times 10^3$ | $5.93 \times 10^3$ | $6.13 \times 10^3$ |
| Ultimate Strength, psi | $5.45 \times 10^3$ | $5.08 \times 10^3$ | $5.05 \times 10^3$ | $5.43 \times 10^3$ |
| Elongation, % | 130 | 60 | 30 | 65 |
| HDT, °C. | 65 | 66 | 63 | 64 |

Notes:
1. ASA Modifiers prepared by the process of Examples 1 and 2, using the indicated S:AN ratios and levels of trimethylol propane triacrylate.
2. Control A is a blend of PVC masterbatch of Example 3 with 15 wt% of Acryloid KM-323B PVC impact modifier from Rohm and Hass Co.

The flow properties of PVC blends with the flow improvers of this invention were measured in a Monsanto Capillary Rheometer at 375° F. and 70 psi pressure, using capillary 2-07 having a diameter of 0.0415 in and L/D ratio of 15:1. The melt flow index was calculated from the extrusion time for one volume (1.033 cc) of polymer melt and reported in cc. per 10 min. The melt flow properties for the PVC blend of Example 5 and for two control blends are summarized in Table II. Control blends A, $A_1$ and $A_2$ were prepared with the PVC masterbatch of Example 3 and a commercial acrylic-based PVC modifier. Control blends B, $B_1$ and $B_2$ were prepared with the masterbatch of Example 3 and an emulsion prepared ASA graft copolymer made substantially by the process disclosed in U.S. Pat. No. 3,041,307.

TABLE II

| Melt Flow Properties of ASA/PVC Blends | | | |
|---|---|---|---|
| Ex. No. | Modifier | | Melt Flow (1) |
| | Type | wt % | |
| 7 | ASA(Ex5) | 5 | 12 |
| 8 | ASA(Ex5) | 12 | 40 |
| 9 | ASA(Ex5) | 15 | 57 |
| 10 | ASA(Ex4) | 15 | 60 |
| 11 | ASA(Ex6) | 15 | 66 |
| A | Acrylic (2) | 5 | 7.6 |
| $A_1$ | Acrylic (2) | 12 | 7.5 |
| $A_2$ | Acrylic (2) | 15 | 7.6 |
| B | Emul ASA(3) | 10 | 14.1 |
| $B_1$ | Emul ASA(3) | 12 | 10.2 |
| $B_2$ | Emul ASA(3) | 15 | 11.1 |

Notes:
1. Melt Flow = cc/10 min., Monsanto Capillary Rheometer, L/D = 15/1, 70 psi, 375° F.
2. Acrylic = commercial acryloid KM-323B PVC impact modifier obtained from Rohm and Haas Co.
3. Emul ASA = ASA modifier containing 65% butyl acrylate, 15% styrene-acrylonitrile (2:1) prepared by an emulsion process.

It will be apparent from these data that the melt flow properties of the PVC/ASA blends of this invention are unexpectedly quite different from those of either blends containing a commercial acrylate impact modifier or blends with a conventional emulsion grafted ASA composition.

As will be seen from a comparison of the melt flow values for Examples 7–11, melt flow is increased dramatically with increases in ASA content over the range of 5 to 15 wt%. In control blends A, $A_1$ and $A_2$, the melt flow is significantly lower, and is little affected by increased levels of modifier. Control blends B, B₁ and B₂, comprising PVC and an emulsion prepared ASA graft copolymer, are also significantly lower in melt flow and are little affected by changes in ASA content.

This invention will thus be seen to be a PVC blend comprising PVC and from 5 to 20 wt% of an emulsion/suspension graft polymerized ASA resin, and a method for improving the melt flow properties of PVC. It will be apparent to those skilled in the art that the compositions may further comprise additional processing aids, lubricants, antioxidants, stabilizers, dyes, pigments and the like commonly employed in the PVC compounding art, and that further variations and modifications may be accomplished without departing from the spirit of this invention. These compositions by virtue of having good processability without sacrifice in useful mechanical properties may be expected to find wide application in the production of molded and extruded plastic articles.

We claim:

1. A composition comprising polyvinyl chloride (PVC) and an acrylonitrile-styrene-poly(butyl acrylate) (ASA) graft copolymer wherein said ASA graft copolymer is prepared by polymerizing acrylonitrile and styrene monomers in the presence of an emulsion of poly(butyl acrylate) and from 0.1 to about 1.0 parts per 100 parts of graft polymer of a mixture of polyvinyl pyrrolidone (PVP) and polyvinyl alcohol (PVA) in the ratio of from about 1 to 4 parts of PVP to about 4 to 1 parts of PVA, thereby converting the polymerization system from an emulsion to a suspension.

2. The composition of claim 1 wherein said PVC comprises from about 95 to about 80 wt% of the final composition and the ASA comprises from about 5 to about 20 wt% of the final composition.

* * * * *